US006983486B1

(12) United States Patent
Hanchett

(10) Patent No.: US 6,983,486 B1
(45) Date of Patent: Jan. 3, 2006

(54) METHOD AND APPARATUS FOR ESTABLISHING SECURITY SCANNER ATTRIBUTES IN A COMPUTER SYSTEM

(75) Inventor: Paul F. Hanchett, Gresham, OR (US)

(73) Assignee: McAfee, Inc., Santa Clara, CA (US)

( * ) Notice: Subject to any disclaimer, the term of this patent is extended or adjusted under 35 U.S.C. 154(b) by 971 days.

(21) Appl. No.: 09/713,095

(22) Filed: Nov. 14, 2000

(51) Int. Cl.
G06F 11/30 (2006.01)
G06F 12/14 (2006.01)
H04L 9/00 (2006.01)
H04L 9/32 (2006.01)

(52) U.S. Cl. .......................... 726/22; 726/24; 713/188; 707/9; 707/103 R; 717/116

(58) Field of Classification Search ................ 713/188, 713/200, 202, 201; 717/168–173, 116; 714/3, 714/38, 35; 707/9, 101, 102, 200, 204, 103 R; 707/ 726/22, 24
See application file for complete search history.

(56) References Cited

U.S. PATENT DOCUMENTS

| 5,710,920 | A | * | 1/1998 | Maruyama et al. ...... 707/103 R |
| 5,897,636 | A | * | 4/1999 | Kaeser ........................ 707/100 |
| 6,018,741 | A | * | 1/2000 | Howland et al. ............ 707/102 |
| 6,041,347 | A |   | 3/2000 | Harsham et al. ............ 709/220 |
| 6,055,534 | A | * | 4/2000 | Nishino ........................ 707/10 |
| 6,055,539 | A | * | 4/2000 | Singh et al. ................. 707/102 |
| 6,216,140 | B1 | * | 4/2001 | Kramer ........................ 715/511 |
| 6,233,730 | B1 | * | 5/2001 | Todd et al. .................. 717/108 |
| 6,269,456 | B1 | * | 7/2001 | Hodges et al. ................. 714/38 |
| 6,275,937 | B1 | * | 8/2001 | Hailpern et al. ............. 713/188 |
| 6,377,957 | B1 | * | 4/2002 | Jeyaraman ................... 707/200 |
| 6,542,884 | B1 | * | 4/2003 | Soderberg et al. ............. 707/1 |
| 6,651,249 | B2 | * | 11/2003 | Waldin et al. .............. 717/170 |
| 6,751,622 | B1 | * | 6/2004 | Puri et al. .................... 707/101 |

OTHER PUBLICATIONS

Steve R. White, Open Problems in Computer Virus Research, Oct. 1998, IBM Thomas J. Watson Research center Yorktown Heights, NY.*

* cited by examiner

Primary Examiner—Kim Vu
Assistant Examiner—Beemnet W Dada
(74) Attorney, Agent, or Firm—Zilka-Kotab, PC; Christopher J. Hamaty

(57) ABSTRACT

One embodiment of the present invention provides a system that establishes a list of security scanner attributes for a computing node within a hierarchy of computing nodes. The list of security scanner attributes is associated with a security scanner action to be performed by a security scanner program. The system establishes a hierarchy of lists of attributes, with each attribute being comprised of an attribute identifier and an attribute value. The attribute value may be either a list of attributes or a controlling value used by the security scanner program to control the operation of the security scanner program. The list of attributes also has a grouping attribute which indicates: that an element of the list may be updated without also updating other elements in the list; that updating an element requires all other elements of the list to be updated; or that updating the element requires the element, all other elements, and all subordinate elements of the list of attributes to be updated.

9 Claims, 4 Drawing Sheets

METHOD AND APPARATUS FOR ESTABLISHING SECURITY SCANNER ATTRIBUTES IN A COMPUTER SYSTEM

BACKGROUND

1. Field of the Invention

The present invention relates to computer security and detection of malicious software. More specifically, the present invention relates to a method and an apparatus for assigning a list of security scanner attributes for computing devices within a hierarchy of computing nodes.

2. Related Art

Many computer users, particularly on the Internet, find delight in infecting another user's computer with malicious software, such as a computer virus. A computer virus is designed to replicate itself across a network of computer systems, and to interfere with the normal use of computer systems by possibly denying access, deleting data, or any of a number of other malevolent tricks. As computer systems become increasingly interconnected, protection from malicious users is becoming increasingly more important.

A software scanner can be used to protect a computer user from malicious software. A scanner makes use of a list of attributes, generated by a computer system administrator, to inspect files and to take actions specified by the list of attributes when it finds any malicious software.

Managing such a list of attributes for virus protection on a large computer network, a Corporate Intranet for example, is difficult because there are many computers and, possibly, many sites separated by large distances. To ensure that the list of attributes provides meaningful protection, the attributes are often managed globally for the network. In order to do so, a security administrator must visit each node in the hierarchy of computing nodes, either in person or across the network, to establish attributes for a software scanner located on each node.

However, a specific node may require a customized list of attributes in order to accommodate a specific hardware configuration or specific functionality. When a custom list of attributes is used for a specific computing device, the security administrator must remember to reset the custom settings at the node whenever the general list of attributes is changed. This can be a time-consuming task if many nodes in the network must be customized.

What is needed is a system that facilitates both efficient global and local control of a list of scanner attributes throughout a network of computing nodes.

SUMMARY

One embodiment of the present invention provides a system that establishes a list of security scanner attributes for a computing node within a hierarchy of computing nodes. The list of security scanner attributes is associated with a security scanner action to be performed by a security scanner program. The system establishes a hierarchy of lists of attributes, with each attribute being comprised of an attribute identifier and an attribute value. The attribute value may be either a list of attributes or a controlling value used by the security scanner program to control the operation of the security scanner program. The list of attributes also has a grouping attribute which indicates: that an element of the list may be updated without also updating other elements in the list; that updating an element requires all other elements of the list to be updated; or that updating the element requires the element, all other elements, and all subordinate elements of the list of attributes to be updated.

In one embodiment of the present invention, the list of attributes contains an identifier that uniquely identifies the element and a value, wherein the value may itself be a list of elements.

In one embodiment of the present invention, the grouping attribute indicates that: the element may be updated without also updating other elements in the list of attributes, updating the element requires all other elements in the list of attributes to be updated, or updating the element requires all other elements in the list of attributes and all subordinate elements in the list of attributes to be updated.

In one embodiment of the present invention, updating the element involves overwriting the value with another value, which may be identical to an original value.

In one embodiment of the present invention, updating the element and all other elements of the list of attributes involves overwriting each value with another value, which may be identical to an original value.

In one embodiment of the present invention, updating the element, all other elements in the list of attributes, and all subordinate elements of the list of attributes involves overwriting each value with another value, which may be identical to an original value for each element and each subordinate element of the list of attributes.

In one embodiment of the present invention, if the attribute being updated is itself another list of attributes, the grouping attribute can indicate one of: the attribute can be updated, the content of the list of attributes can be replaced, or the other list of attributes can be merged with the list of attributes In one embodiment of the present invention, the security scanner program performs a scanning process on files associated with the computing node for malicious computer instructions. Details of the scanning process are specified by the list of security scanner attributes.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Systems

Figure 1:
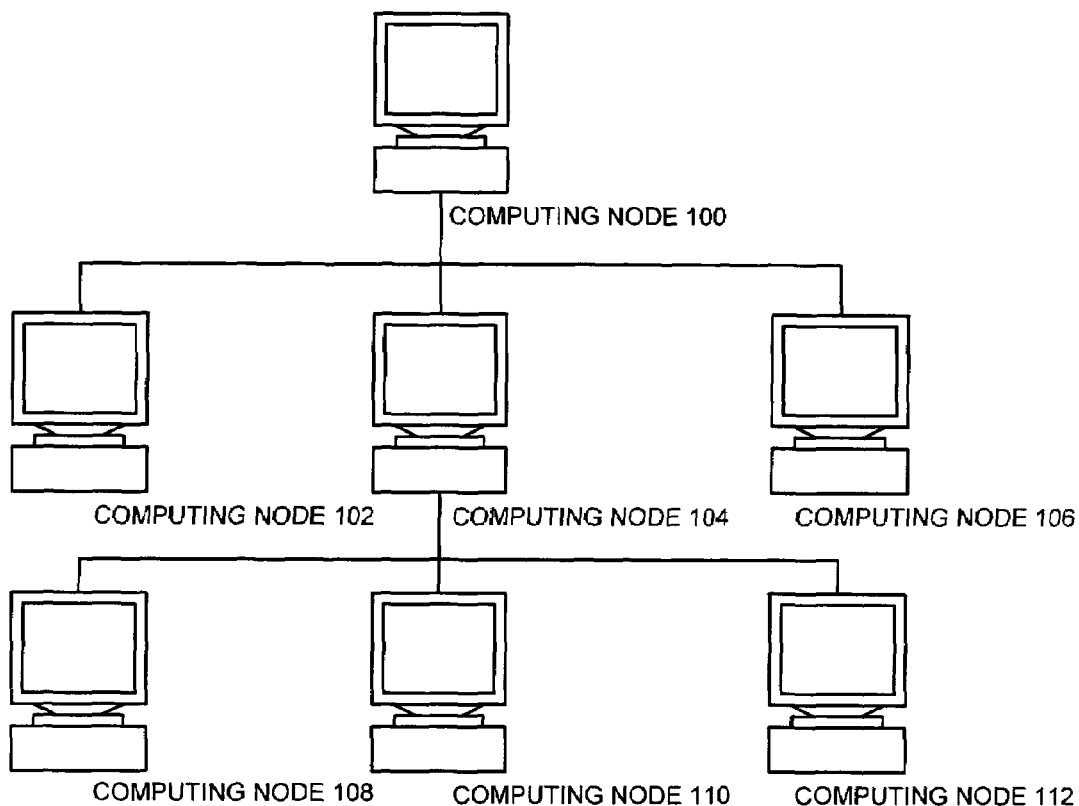
FIG. 1 illustrates a hierarchy of computing nodes in accordance with an embodiment of the present invention.

FIG. 1 illustrates a hierarchy of computing nodes. Within this hierarchy, computing node 100 is a parent node and is coupled to a number of subordinate child nodes including computing nodes 102, 104, and 106. In addition to being a child node of computing node 100, computing node 104 is itself a parent node for computing nodes 108, 110, and 112. In general, any computing node in the hierarchical network can have a parent node and zero or more child nodes. Note that computing nodes 100, 102, 104, 106, 108, 110, and 112 may include any type of computer system, including, but not limited to, a computer system based on a microprocessor, a mainframe computer, a digital signal processor, a personal organizer, a device controller, and a computational engine within an appliance. Also note that computing nodes 100, 102, 104, 106, 108, 110, and 112 may be coupled together by any mechanism for communicating across the network, including, but not limited to, a local area network, a wide area network, or a combination of networks.

A Representative Computing Node

Figure 2:
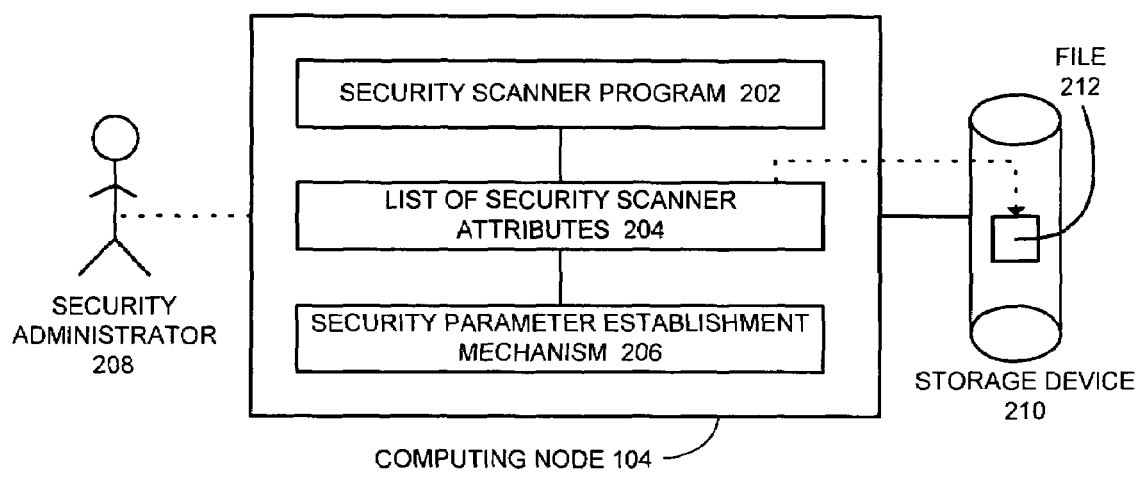
FIG. 2 illustrates the configuration of a single computing node within the hierarchy of computing nodes in accordance with an embodiment of the present invention.

FIG. 2 illustrates the configuration of a single computing node within the hierarchy of computing nodes in accordance with an embodiment of the present invention. Computing node 104 contains a list of security scanner attributes 204 that is used by security scanner program 202 to scan file 212 located on storage device 210 for malicious code. Computing node 104 inherits list of security scanner attributes 204 from its parent node using security scanner establishment mechanism 206. If computing node 104 does not have a parent node, a security administrator 208 can establish list of security scanner attributes 204 by using security parameter establishment mechanism 206.

Security administrator 208 uses security parameter establishment mechanism 206 to traverse the list of security scanner attributes 204 to determine if the elements of list of security scanner attributes 204 are allowed to be changed by computing node 104. Details of list of security scanner attributes 204 are provided with the discussion of FIG. 3 below. If allowed, security administrator 208 uses security parameter establishment mechanism 206 to establish a changed list of security scanner attributes 204. Security administrator 208 also uses security parameter establishment mechanism 206 to set a grouping attribute at each node to indicate to child nodes how list of security scanner attributes 204 may be changed.

The List of Security Scanner Attributes

Figure 3:
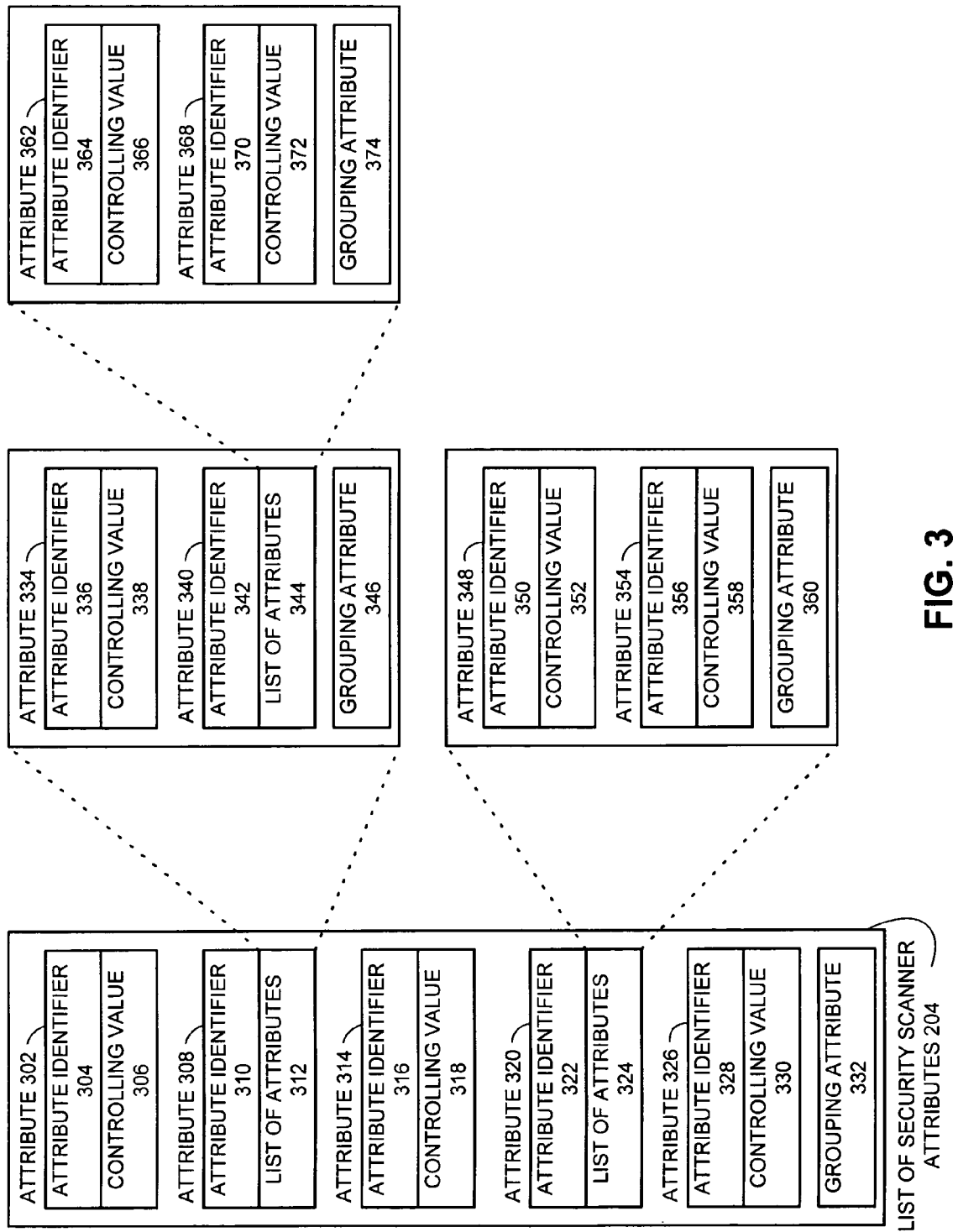
FIG. 3 illustrates a list of security scanner attributes in accordance with an embodiment of the present invention.

FIG. 3 illustrates an example list of security scanner attributes 204. List of security scanner attributes 204 includes attributes 302, 308, 314, 320, and 326. List of security scanner attributes 204 also includes grouping attribute 332. Each attribute includes an attribute identifier and one of: a controlling value and a list of attributes.

Attributes 302, 308, 314, 320, and 326 include attribute identifiers 304, 310, 316, 322, and 328 respectively. Attributes 302, 314, and 326 include controlling values 306, 318, and 330 respectively while attributes 308 and 320 include list of attributes 312 and 324 respectively.

List of attributes 312 includes attributes 334 and 340 and grouping attribute 346. Attributes 334 and 340 include attribute identifiers 336 and 342 respectively. Attribute 334 includes controlling value 338 while attribute 340 includes list of attributes 344.

List of attributes 324 includes attributes 348 and 354 and grouping attribute 360. Attributes 348 and 354 include attribute identifiers 350 and 356 respectively. Attributes 348 and 354 also include controlling values 352 and 358 respectively.

List of attributes 344 includes attributes 362 and 368 and grouping attribute 374. Attributes 362 and 368 include attribute identifiers 364 and 370 respectively. Attributes 362 and 368 also include controlling values 366 and 372 respectively.

Grouping attribute 332 indicates to security parameter establishment mechanism 206 how the attributes of list of security scanner attributes 204 may be changed. Grouping attribute 332 indicates one of: each attribute may be changed individually, all attributes must be changed as a group, and all attributes and subordinate attributes must be changed as a group. Similarly, grouping attributes 346, 360, and 374 indicate how lists of attributes 312, 324, and 344 respectively may be changed.

Security scanner program 202 uses controlling values 306, 318, 330, 338, 352, 358, and 372 to scan file 212.

Process of Establishing a List of Security Scanner Attributes

Figure 4:
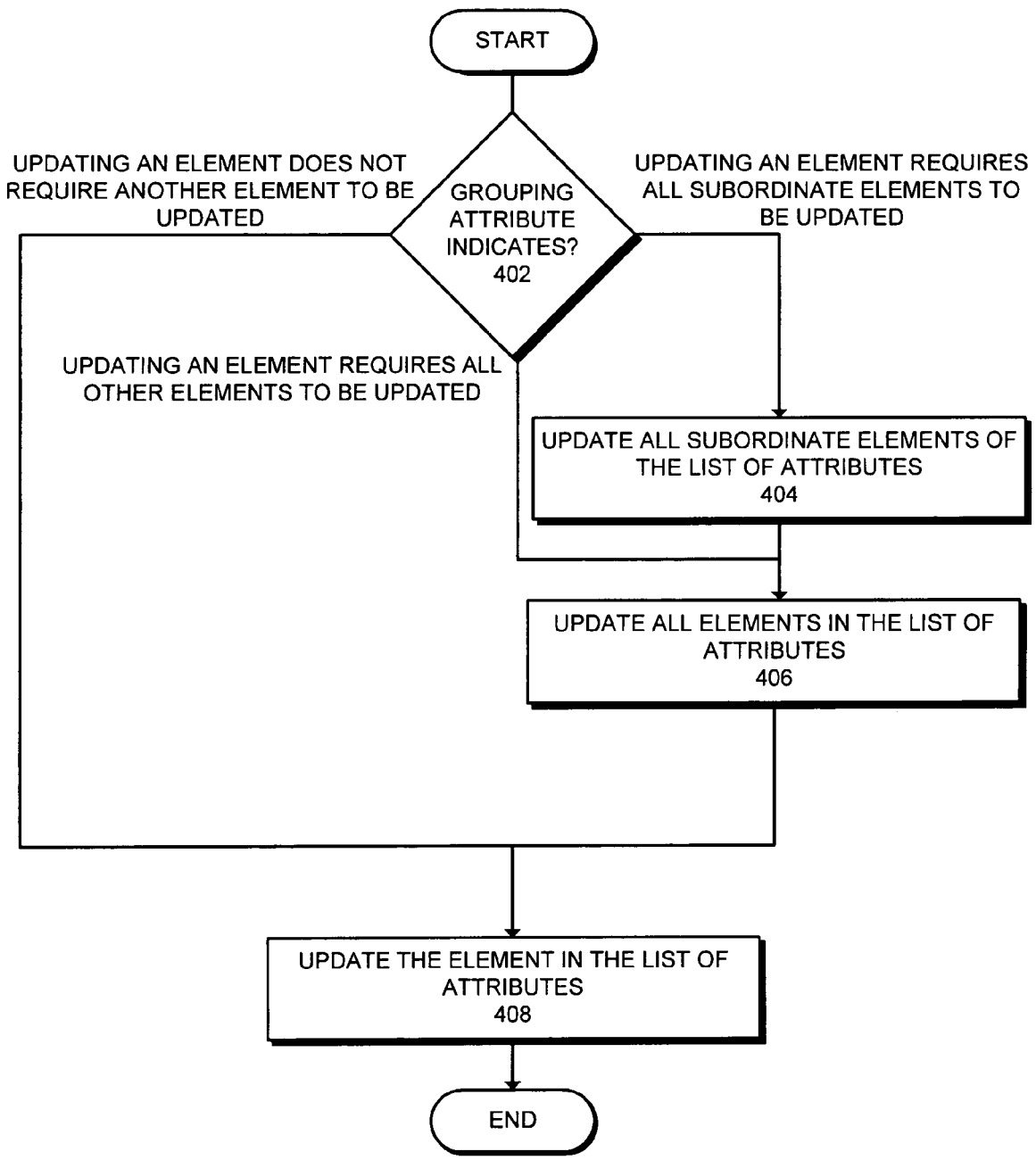
FIG. 4 is a flowchart illustrating the processes of establishing a list of security scanner attributes in accordance with an embodiment of the present invention.

FIG. 4 is a flowchart illustrating the process of establishing a list of security scanner attributes, say list of attributes 312. The system starts when security administrator 208 uses security parameter establishment mechanism 206 to initiate changes to list of attributes 312. Security parameter establishment mechanism 206 inspects grouping attribute 346 to determine whether: each element may be changed individually; all elements must be changed as a group; or all elements and subordinate elements must be changed as a group (step 402).

If all elements and subordinate elements must be changed as a group (step 402), security administrator 208 establishes new values for attributes 362 and 368 in list of attributes 344 (step 404). After updating the attributes in step 404, or if step 402 indicates that updating an element requires all other elements to be updated, security administrator 208 establishes new values for attributes 338 and 344 in list of attributes 312 (step 406).

After updating the attributes in step 406, or if step 402 indicates that updating an element does not require another element to be updated, security administrator 208 may establish new values for attributes 338 and 344 in list of attributes 312 as desired (step 408).

Process of Scanning Files for Malicious Program Instructions

Figure 5:
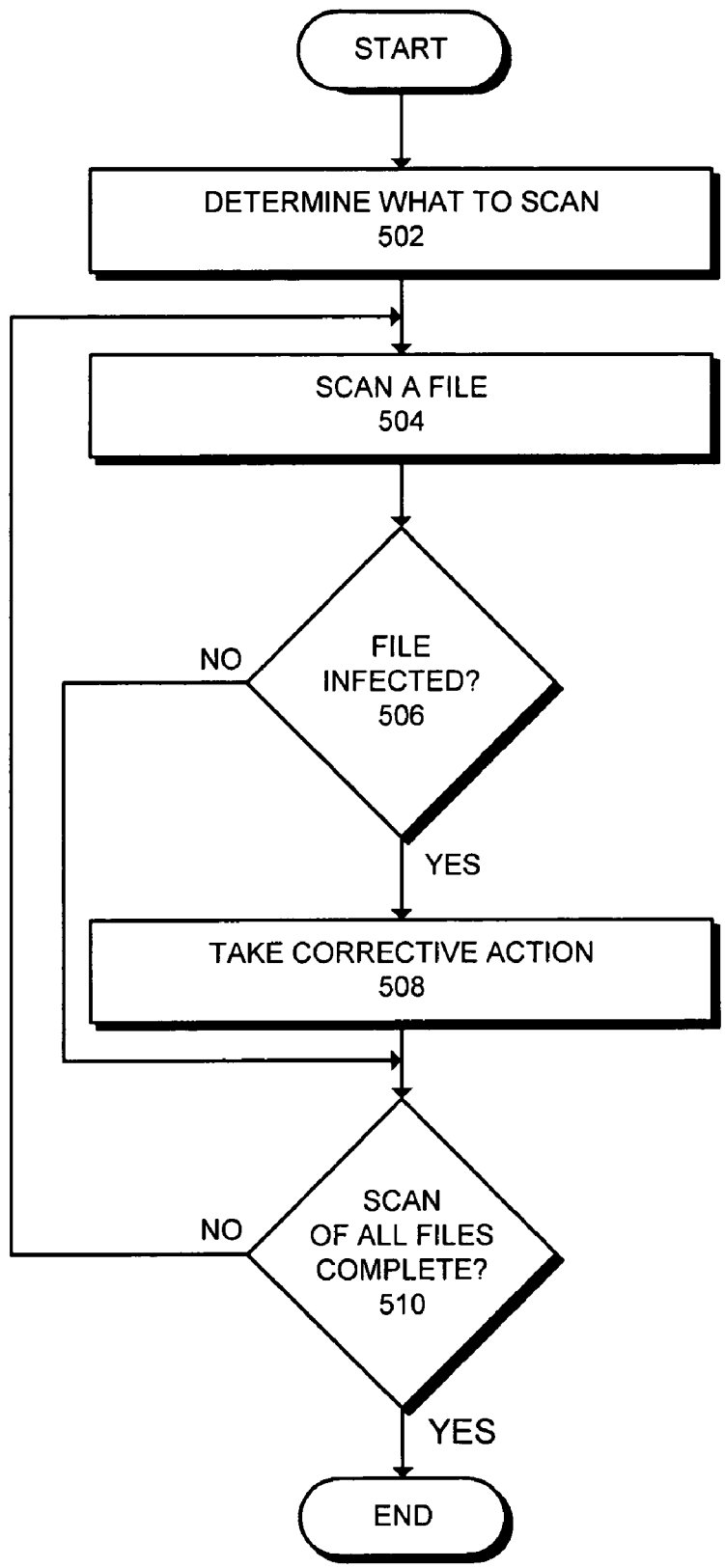
FIG. 5 is a flowchart illustrating the process of scanning files in accordance with an embodiment of the present invention.

FIG. 5 is a flowchart illustrating the process of scanning files in accordance with an embodiment of the present invention. The process starts when security scanner program 202 is activated. Security scanner program 202 determines what files are to be scanned by accessing list of security scanner attributes 204 (step 502). For each file to be scanned, security scanner program 202 scans the file to determine if the file has been infected with malicious code (step 504). If the file has been infected (step 506), security scanner program takes a corrective action specified by list of security scanner attributes 204 (step 508). After step 508, or if the file has not been infected in step 506, security scanner program 202 determines if all specified files have been scanned which means the scan is complete (step 510). If the scan is not complete (step 510), security scanner program 202 returns to scan the next file (step 504). After the scan of all files has been completed, the process ends (step 510).

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for establishing a list of security scanner attributes for a computing node within a hierarchy of computing nodes, the list of security scanner attributes being associated with a security scanner action to be performed by a security scanner program, the method comprising:

establishing a hierarchy of lists of attributes, an attribute being comprised of an attribute identifier and an attribute value, the attribute value being comprised of a list of attributes used by the security scanner program to control an operation of the security scanner program, the list of attributes being comprised of a grouping attribute and a series of one or more attributes;

examining the grouping attribute associated with the list of attributes;

updating an element of the list of attributes if the grouping attribute indicates that the element may be updated without also updating other elements in the list of attributes;

updating the element and all other elements of the list of attributes if the grouping attribute indicates that updating the element requires all other elements to be updated; and updating the element, all other elements, and all subordinate elements of the list of attributes if the grouping attribute indicates that updating the element requires all subordinate elements of the list of attributes to be updated;

wherein the grouping attribute is associated with the entire list of attributes for controlling the updating through selection of at least one of at least three scenarios by indicating at least one of:

the element may be updated without also updating other elements in the list of attributes, updating the element requires all other elements in the list of attributes to be updated, and updating the element requires all other elements in the list of attributes and all subordinate elements in the list of attributes to be updated;

wherein updating the element involves overwriting the value with another value that may be identical to an original value;

wherein updating the element and all other elements of the list of attributes involves overwriting each value with another value that may be identical to an original value;

wherein updating the element, all other elements in the list of attributes, and all subordinate elements of the list of attributes involves overwriting each value with another value that may be identical to an original value for each element and each subordinate element of the list of attributes;

wherein the attribute value includes a second list of attributes used by the security scanner program to control the operation of the security scanner program;

wherein the second list of attributes includes a second grouping attribute associated with each of the attributes of the second list;

wherein the element of the list of attributes contains an identifier that uniquely identifies the element and a value, wherein the value may itself be a list of elements;

wherein the list of security scanner attributes determines the files to be scanned by the security scanner program;

wherein the list of security scanner attributes further determines a corrective action to take in response to the identification of an infected file.

2. The method of claim 1, wherein if the attribute being updated is itself another list of attributes, the grouping attribute can indicate one of:

the attribute can be updated;

a content of the list of attributes can be replaced; and the other list of attributes can be merged with the list of attributes.

3. The method of claim 1, wherein the security scanner program performs a scanning process on files associated with the computing node for malicious computer instructions, wherein details of the scanning process are specified by the list of security scanner attributes.

4. A tangible computer-readable storage medium storing instructions that when executed by a computer causes the computer to perform a method for establishing a list of security scanner attributes for a computing node within a hierarchy of computing nodes, the list of security scanner attributes being associated with a security scanner action to be performed by a security scanner program, the method comprising:

establishing a hierarchy of lists of attributes, an attribute being comprised of an attribute identifier and an attribute value, the attribute value being comprised of a list of attributes used by the security scanner program to control an operation of the security scanner program, the list of attributes being comprised of a grouping attribute and a series of one or more attributes;

examining the grouping attribute associated with the list of attributes;

updating an element of the list of attributes if the grouping attribute indicates that the element may be updated without also updating other element in the list of attributes;

updating the element and all other elements of the list of attributes if the grouping attribute indicates that updating the element requires all other elements to be updated; and updating the element, all other elements, and all subordinate elements of the list of attributes if the grouping attribute indicates that updating the element requires all subordinate elements of the list of attributes to be updated;

wherein the grouping attribute is associated with the entire list of attributes for controlling the updating through selection of at least one of at least three scenarios by indicating at least one of:

the element may be updated without also updating other elements in the list of attributes, updating the element requires all other elements in the list of attributes to be updated, and
updating the element requires all other elements in the list of attributes and all subordinate elements in the list of attributes to be updated;
wherein updating the element involves overwriting the value with another value that may be identical to an original value;
wherein updating the element and all other elements of the list of attributes involves overwriting each value with another value that may be identical to an original value;
wherein updating the element, all other elements in the list of attributes, and all subordinate elements of the list of attributes involves overwriting each value with another value that may be identical to an original value for each element and each subordinate element of the list of attributes;
wherein the attribute value includes a second list of attributes used by the security scanner program to control the operation of the security scanner program;
wherein the second list of attributes includes a second grouping attribute associated with each of the attributes of the second list;
wherein the element of the list of attributes contains an identifier that uniquely identifies the element and a value, wherein the value may itself be a list of elements;
wherein the list of security scanner attributes determines the files to be scanned by the security scanner program;
wherein the list of security scanner attributes further determines a corrective action to take in response to the identification of an infected file.

5. The computer-readable storage medium of claim 4, wherein if the attribute being updated is itself another list of attributes, the grouping attribute can indicate one of:
the attribute can be updated;
a content of the list of attributes can be replaced; and
the other list of attributes can be merged with the list of attributes.

6. The computer-readable storage medium of claim 4, wherein the security scanner program performs a scanning process on files associated with the computing node for malicious computer instructions, wherein details of the scanning process are specified by the list of security scanner attributes.

7. An apparatus that facilitates establishing a list of security scanner attributes for a computing node within a hierarchy of computing nodes, the list of security scanner attributes being associated with a security scanner action to be performed by a security scanner program, comprising:
an establishing mechanism that is configured to establish a hierarchy of lists of attributes, an attribute being comprised of an attribute identifier and an attribute value, the attribute value being comprised of a list of attributes used by the security scanner program to control an operation of the security scanner program, the list of attributes being comprised of a grouping attribute and a series of one or more attributes;
an examining mechanism that is configured to examine the grouping attribute associated with the list of attributes;
an updating mechanism that is configured to update an element of the list of attributes if the grouping attribute indicates that the element may be updated without also updating other elements in the list of attributes;
wherein the updating mechanism is further configured to update the element and all other elements of the list of attributes if the grouping attribute indicates that updating the element requires all other elements to be updated; and
wherein the updating mechanism is further configured to update the element, all other elements, and all subordinate elements of the list of attributes if the grouping attribute indicates that updating the element requires all subordinate elements of the list of attributes to be updated;
wherein the grouping attribute is associated with the entire list of attributes for controlling the updating through selection of at least one of at least three scenarios by indicating at least one of:
the element may be updated without also updating other elements in the list of attributes,
updating the element requires all other elements in the list of attributes to be updated, and
updating the element requires all other elements in the list of attributes and all subordinate elements in the list of attributes to be updated;
wherein updating the element involves overwriting the value with another value that may be identical to an original value;
wherein updating the element and all other elements of the list of attributes involves overwriting each value with another value that may be identical to an original value;
wherein updating the element, all other elements in the list of attributes, and all subordinate elements of the list of attributes involves overwriting each value with another value that may be identical to an original value for each element and each subordinate element of the list of attributes;
wherein the attribute value includes a second list of attributes used by the security scanner program to control the operation of the security scanner program;
wherein the second list of attributes includes a second grouping attribute associated with each of the attributes of the second list;
wherein the element of the list of attributes contains an identifier that uniquely identifies the element and a value, wherein the value may itself be a list of elements;
wherein the list of security scanner attributes determines the files to be scanned by the security scanner program;
wherein the list of security scanner attributes further determines a corrective action to take in response to the identification of an infected file.

8. The apparatus of claim 7, wherein if the attribute being updated is itself another list of attributes, the grouping attribute can indicate one of:
the attribute can be updated;
a content of the list of attributes can be replaced; and
the other list of attributes can be merged with the list of attributes.

9. The apparatus of claim 7, wherein the security scanner program is configured to perform a scanning process on files associated with the computing node for malicious computer instructions, wherein details of the scanning process are specified by the list of security scanner attributes.

* * * * *

UNITED STATES PATENT AND TRADEMARK OFFICE
CERTIFICATE OF CORRECTION

PATENT NO. : 6,983,486 B1  Page 1 of 1
APPLICATION NO. : 09/713095
DATED : January 3, 2006
INVENTOR(S) : Paul F. Hanchett It is certified that error appears in the above-identified patent and that said Letters Patent is hereby corrected as shown below:

In the claims:
col. 6, line 31 delete "tangible" before "computer-readable" and after "A";
col. 6, line 50 replace "element" to --elements--.

Signed and Sealed this

Second Day of February, 2010

David J. Kappos
*Director of the United States Patent and Trademark Office*